May 19, 1925.
R. L. HORSLEY
1,538,330
BALE REBANDER
Filed May 9, 1924
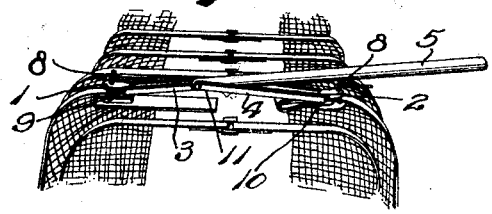
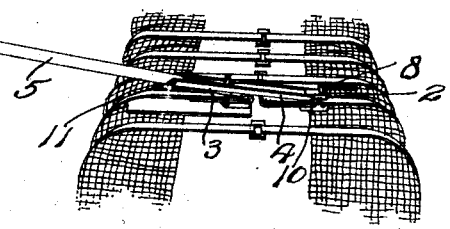
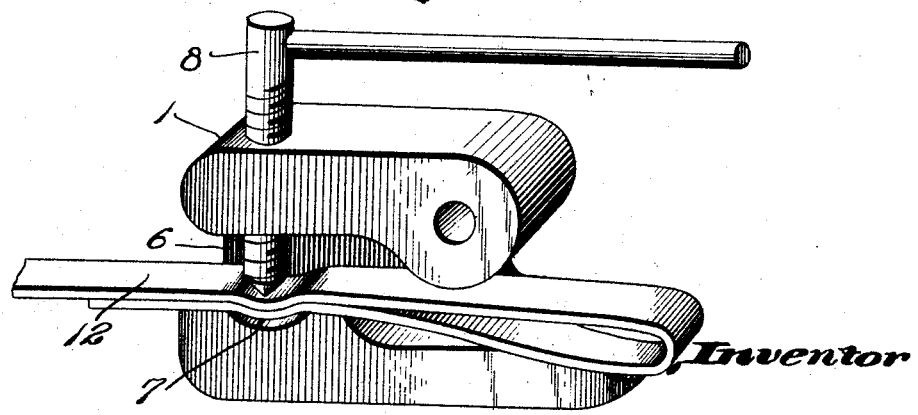
Robert L. Horsley Patented May 19, 1925.

1,538,330

UNITED STATES PATENT OFFICE.

ROBERT L. HORSLEY, OF MEMPHIS, TENNESSEE.

BALE REBANDER.

Application filed May 9, 1924. Serial No. 712,058.

*To all whom it may concern:*

Be it known that I, ROBERT L. HORSLEY, a citizen of the United States, residing at Memphis, in the county of Shelby and State of Tennessee, have invented certain new and useful Improvements in Bale Rebanders, of which the following is a specification, reference being had therein to the accompanying drawings, which are made a part of this application.

This invention relates to a device for replacing burst bands or ties on bales of cotton, and the like, and has for its object the provision of a simple, economic and efficient means for rebanding bales in a neat, substantial manner without having to return bales to the press.

Another object is to provide an efficient rebander having increasing leverage as the band becomes tighter, and capable of being operated by one man only.

With these and other objects in view, my invention comprises certain novel combinations, constructions and arrangements of parts as will be hereinafter described, illustrated in the drawings and more particularly pointed out in the appended claim.

In the drawings:

The several views are in perspective.

Figure 1 is a view of one side of a bale of cotton from which a band or tie has burst, with my device thereon ready to draw a band taut around the bale.

Figure 2 is a view after the lever handle has been swept through an arc of approximately 180 degrees, and the bale has been drawn back to shape by the action of the device pulling on the ends of the band. The band loops are shown almost together and if in contact would be in position to apply the buckle. After the lever passes a vertical position leverage will increase at each step until it reaches the limit of movement at the horizontal, thus giving great power where most is needed.

Figure 3 shows, in detail, the construction of blocks and screw attachments for grasping the ends of a bale band.

Referring to the drawings by numerals, the outstanding parts of the device comprise blocks 1 and 2, with flat bars 3, 3 and 4, 4 for connecting the blocks, at individual points, to iron pipe lever 5.

Block 1, Fig. 3, is provided with a longitudinal opening 6 through its front side to receive, edgewise, a loop at one end of a bale band and has a recess or countersink 7 under the opening and near the rear end of the block. Handscrew 8 is threaded into said block above the recess 7 and extends into opening 6 and has its end tapered so that, when brought down, it will fall in the recess in a manner to crimp an applied section of a bale band into said recess and hold it in a clamped, crimped condition.

The blocks 1 and 2 are alike except that they are rights and lefts and block 2 is made a little wider to align the bars 4, 4 on the outside of the bars 3, 3 in the ensemble.

In the whole, the bars 3, 3 are welded or otherwise rigidly secured at one end to the sides of one end of the iron pipe lever 5, and the front end of block 1 is brought between the free ends of said bars and holes are bored through block and bars and pin 9 is inserted; and in like manner block 2 is secured between the ends of bars 4, 4 by pin 10 and the other ends of the bars are secured on the outside of the union of the bars 3, 3 with the lever 5 by pin 11.

The pins 9, 10, 11 are fitted loosely enough to permit a partial rotation of the connected parts and their ends are slightly riveted to prevent displacement.

To operate, the device with the blocks in nearest proximity is layed across the bale where a band is brought around to be tightened, a loop is bent on the end of the band adjacent to block 2 and secured in this block by bringing the handscrew down and clamping the band as at 7 in Fig. 3, but allowing this looped section to protrude past the front end of the block far enough to meet the front end of block 1. The lever is then thrown back to spread the blocks apart and the other end of the band is likewise secured in block 1 but with the end of the loop even with the front end of the block. A board is placed under and extending forward of block 1 (board is usually necessary to prevent block 1 from settling in the fiber) and the lever is then operated to force the two loops of the band together. When the loops are made to touch each other apply the buckle by starting the opening into the same on over both loops at once where they touch.

I have shown what appears to be the simplest form for substantially incorporating my idea but I do not limit myself to this exact construction.

What I claim is:

A device of the class described, comprising a lever with its lower end bifurcated and a block pivoted therein, two straps pivoted at one of their ends to opposite sides of said lever at a distance from its lower end and a second block secured between the free ends of said straps, the said blocks having grooves for receiving and means for holding therein the ends of a bale band to be drawn together by operating said lever.

ROBERT L. HORSLEY.